United States Patent
Sadoughi-Yarandi et al.

(10) Patent No.: US 9,529,730 B2
(45) Date of Patent: Dec. 27, 2016

(54) METHODS FOR CACHE LINE EVICTION

(71) Applicant: Apple Inc., Cupertino, CA (US)

(72) Inventors: Mahnaz Sadoughi-Yarandi, Santa Clara, CA (US); Perumal R. Subramonium, San Jose, CA (US); Brian P. Lilly, San Francisco, CA (US); Hari S. Kannan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 267 days.

(21) Appl. No.: 14/263,386

(22) Filed: Apr. 28, 2014

(65) Prior Publication Data

US 2015/0309944 A1 Oct. 29, 2015

(51) Int. Cl.
*G06F 12/12* (2016.01)

(52) U.S. Cl.
CPC ..... *G06F 12/122* (2013.01); *G06F 2212/1021* (2013.01); *G06F 2212/1024* (2013.01); *G06F 2212/1041* (2013.01)

(58) Field of Classification Search
CPC ............ G06F 12/122; G06F 2212/1024; G06F 2212/1021; G06F 2212/1041
See application file for complete search history.

(56) References Cited

U.S. PATENT DOCUMENTS

| | | | | |
|---|---|---|---|---|
| 7,457,920 | B1 * | 11/2008 | Kornegay | G06F 12/127 711/133 |
| 8,417,891 | B2 * | 4/2013 | Li | G06F 12/0815 711/130 |
| 8,539,159 | B2 | 9/2013 | Chauvel et al. | |
| 2010/0318998 | A1 | 12/2010 | Golla | |
| 2012/0198174 | A1 | 8/2012 | Nellans et al. | |

OTHER PUBLICATIONS

"Counter-Based Cache Replacement Algorithms", Mazen Kharbutli and Yan Solihin,, Proceedings of the International Conference on Computer Design, Oct. 25, 2005, pp. 1-9.

* cited by examiner

*Primary Examiner* — Michael Alsip
(74) *Attorney, Agent, or Firm* — Meyertons, Hood, Kivlin, Kowert & Goetzel, P.C.

(57) ABSTRACT

A method and apparatus for evicting cache lines from a cache memory includes receiving a request from one of a plurality of processors. The cache memory is configured to store a plurality of cache lines, and a given cache line includes an identifier indicating a processor that performed a most recent access of the given cache line. The method further includes selecting a cache line for eviction from a group of least recently used cache lines, where each cache line of the group of least recently used cache lines occupy a priority position less that a predetermined value, and then evicting the selected cache line.

17 Claims, 6 Drawing Sheets

METHODS FOR CACHE LINE EVICTION

BACKGROUND

Technical Field

This disclosure relates to processor cache operation, and more particularly to cache management mechanisms.

Description of the Related Art

Modern processors use a number of cache memory hierarchies in an effort to expedite data retrieval from main memory. In particular, most all processor cores will have at least a level one (L1) cache that is proximal to the core. In many cases, and especially in multi-core designs, a processor will also have a level two (L2) cache, and in some cases a level three (L3) cache. The L2 and L3 caches are in many cases shared among the various processor cores. The multiple cache hierarchies allow a processing system to keep copies of data that is accessed frequently in the local faster cache memory hierarchy, rather than having to access main memory which is typically slower.

When a processor requests data or a program instruction that is not contained within a cache memory, a further request may be made to main memory for desired information. The processor may also request that the information be stored in the cache memory so that the information may subsequently be retrieved from the cache memory as opposed to main memory. Storing new information in a cache memory may be dependent upon available space within the cache memory. In cases where the cache memory is already storing its maximum number of cache lines, a line may need to be selected for removal (commonly referred to as "eviction") from the cache memory. Once a previously stored cache line has been selected and evicted from the cache memory, a new cache line may be stored.

SUMMARY OF THE EMBODIMENTS

Various embodiments of a method for evicting cache lines from a cache memory are disclosed. Broadly speaking, a method and system are contemplated in which circuitry coupled to a cache memory may be configured to receive a request from a given one of a plurality of processors to store a new cache line in the cache memory. The cache memory may be configured to store a plurality of cache lines, and each cache line may include an identifier. The included identifier may indicate a processor that performed a most recent access to the corresponding cache line. The circuitry may be further configured to select a cache line from a group of least recently used cache lines. Each cache line of the group of least recently used cache lines may occupy a least recently used position less than a predetermined value. The circuitry may be further configured to evict the selected cache line.

In one embodiment, the circuitry may be further configured to determine a number of cache lines accessed by each processor of the plurality of processors dependent upon the identifier included in each cache line. In response to a determination that the number of cache lines accessed by each processor of the plurality of process is less than a threshold value, the circuitry may then select a cache line from first group of cache lines. The identifier of each cache line in the first group of cache lines may correspond to the given one of the plurality of processors.

In another non-limiting embodiment, circuitry may be further configured to, in response to a determination that the number of cache lines accessed by at least one processor of the plurality of processors is greater than the threshold value, select for eviction a least recently used cache line from a second group of cache lines. The identifier of each cache line in the second group of cache lines may correspond to the at least one processor.

Figure 1:
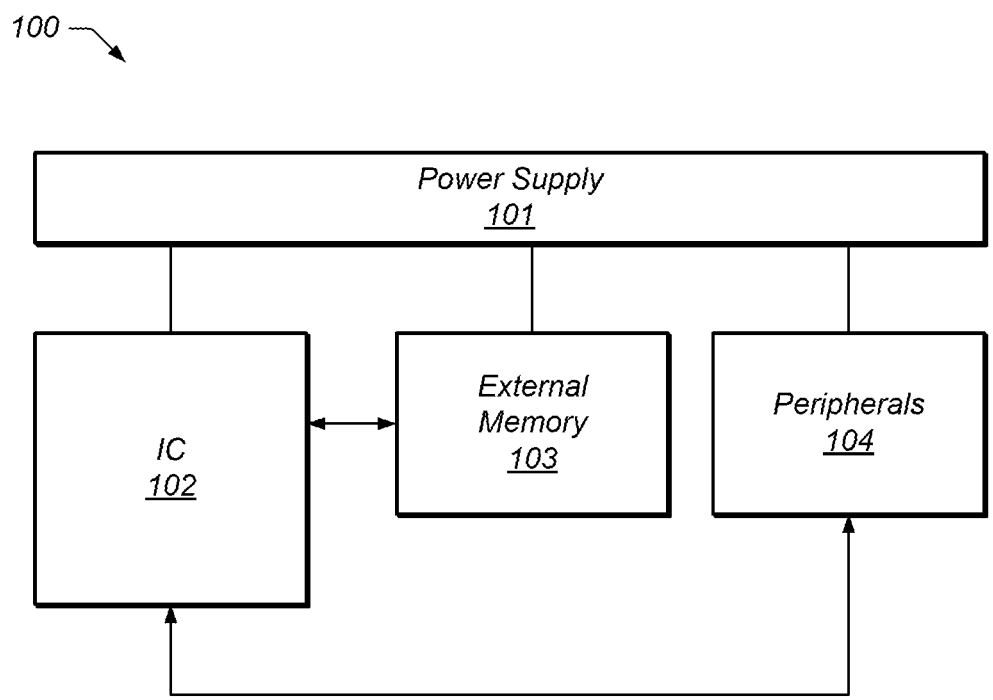
FIG. 1 is a block diagram of an embodiment of a computer system.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF THE EMBODIMENTS

Cache memories are often shared among various processors or processing cores to improve computing performance by reducing a need for a given processor or core to retrieve data directly from memory. As program instructions are executed, a processor may request to have new data stored in a cache memory. In some cases, there may be no available storage within a cache memory, resulting in the need to evict a previous stored cache line from the cache memory. When a cache line is evicted, it may be checked to determine if the cache line contains data that needs to be written back to memory.

Some eviction schemes attempt to select cache lines that have not been accessed for a period of time (commonly referred to as "least recently used") for eviction to minimize the impact on processor performance. In cases of multiple processors, however, a request to store a new cache line by one processor, may evict a line being used by another processor. When this occurs, computing performance may be degraded. The embodiments illustrated in the drawings and described below may provide techniques for selecting cache lines for eviction while reducing the impact on computing performance.

Processing System Overview

A block diagram of one embodiment of a computing system is illustrated in FIG. 1. The system 100 includes an instance of the integrate circuit (IC) 102 coupled to one or more peripherals 104 and an external system memory 103. The system 100 also includes a power supply 101 that may provide one or more supply voltages to the IC 102 as well as one or more supply voltages to the memory 103 and/or the peripherals 104. In some embodiments, more than one instance of the IC 102 may be included.

The peripherals 104 may include any desired circuitry, depending on the type of system. For example, in one embodiment, the system 100 may be included in a mobile device (e.g., personal digital assistant (PDA), smart phone, etc.) and the peripherals 104 may include devices for various types of wireless communication, such as WiFi, Bluetooth, cellular, global positioning system, etc. The peripherals 104 may also include additional storage, including RAM storage, solid-state storage, or disk storage. The peripherals 104 may include user interface devices such as a display screen, including touch display screens or multitouch display screens, keyboard or other input devices, microphones, speakers, etc. In other embodiments, the system 100 may be included in any type of computing system (e.g., desktop personal computer, laptop, tablet, workstation, net top, etc.).

The system memory 103 may include any type of memory. For example, the system memory 405 may be in the DRAM family such as synchronous DRAM (SDRAM), double data rate (DDR, DDR2, DDR3, etc.), or any low power version thereof. System memory 104 may, however, also be implemented in SDRAM, static RAM (SRAM), or other types of RAM, etc.

Figure 2:
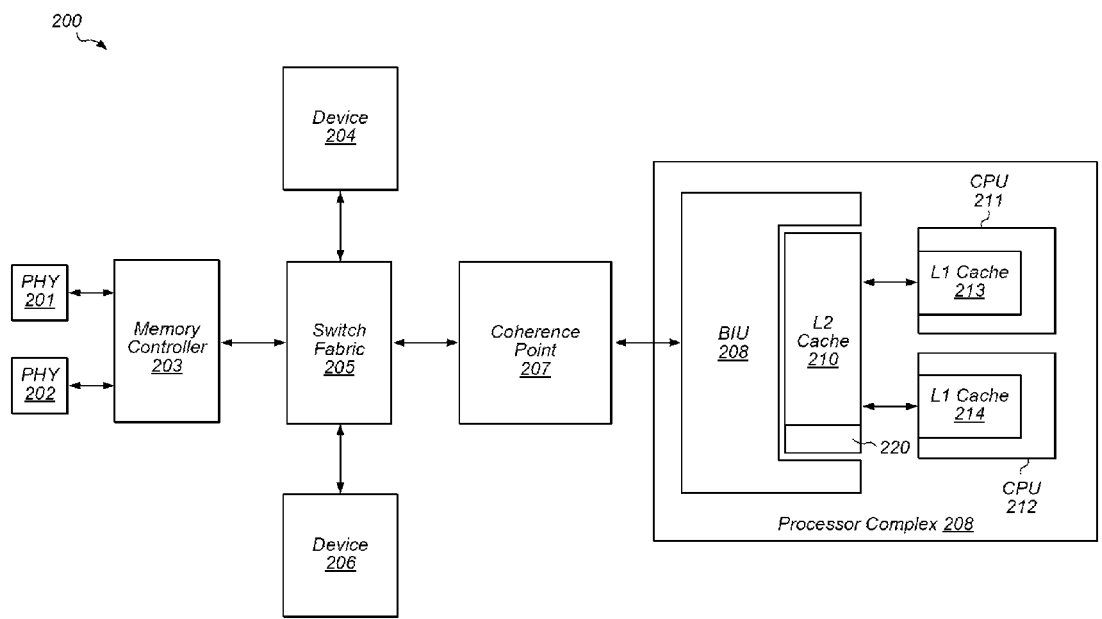
FIG. 2 is a block diagram of an embodiment of an integrated circuit.

Turning now to FIG. 2, a block diagram illustrating one embodiment of a portion of an integrated circuit (IC) is shown. IC 200 may, in various embodiments, correspond to IC 102 as illustrated in FIG. 1. In the illustrated embodiment, IC 200 includes processor complex 208, coherence point 207, switch fabric 205, devices 204 and 206, memory controller 203, and memory physical interface circuits (PHYs) 201 and 202. It is noted that IC 200 may also include many other components not shown in FIG. 1. In various embodiments, IC 200 may also be referred to as a system on chip (SoC), an application specific integrated circuit (ASIC), or an apparatus.

Processor complex 208 may include central processing units (CPUs) 211 and 212, level two (L2) cache 210, and bus interface unit (BIU) 209. In other embodiments, processor complex 208 may include other numbers of CPUs. CPUs 211 and 212 may also be referred to as processors or processor cores. It is noted that processor complex 208 may also include other components not shown in FIG. 2.

The CPUs 211 and 212 may include circuitry to execute instructions defined in an instruction set architecture. Specifically, one or more programs including the instructions may be executed by CPUs 211 and 212. Any instruction set architecture may be implemented in various embodiments. For example, in one embodiment, the ARM™ instruction set architecture (ISA) may be implemented. The ARM instruction set may include 16-bit (or Thumb) and 32-bit instructions. Other exemplary ISA's may include the PowerPC™ instruction set, the MIPS™ instruction set, the SPARC™ instruction set, the x86 instruction set (also referred to as IA-32), the IA-64 instruction set, etc.

As shown, CPU 211 includes a level one (L1) cache 213 and CPU 212 includes an L1 cache 214, and L1 caches 213 and 214 are coupled to L2 cache 210. Other embodiments may include additional cache levels (e.g., level three (L3) cache). L1 caches 213 and 214 and L2 cache 210 may include any capacity and configuration (e.g. direct mapped, set associative, and the like). L2 cache 210 may be coupled to memory controller 203 via BIU 209, coherence point 207, and switch fabric 205. BIU 209 may include various logic structures to couple CPUs 211 and 212 and L2 cache 210 to various other devices and blocks.

L2 cache 210 may include control circuitry 220. In some embodiments, control circuitry 220 may be configured to select previously stored cache lines for eviction from L2 cache 210 responsive to a request from CPU 211 or CPU 212 to store a new cache line in L2 cache 210. Control circuitry 220 may be configured to track a number of times a given cache line in L2 cache 210 has been accessed by a given one of CPU 211 and CPU 212. In various embodiments, control circuitry 220 may include one or more data bits that may be used to select from one of numerous eviction selection algorithms. The one or more data bits may, in other embodiments, also be used to set various threshold values, such as, e.g., a quota for a number of lines a given CPU may access within a cache memory.

Coherence point 207 may be configured to act as a gateway between the coherent and non-coherent domains in IC 200. Coherence point 207 may be the location in IC 200 where memory operations become globally visible. Coherence point 207 may also include tags from L2 cache 210 for all coherent agents in IC 200 and which may be snooped by coherence point 207 for coherency operations. Coherence point 207 may also include additional logic (e.g., coherence control unit, memory interface unit, current transaction table) not shown in FIG. 2. For example, in various embodiments, coherence point 207 may include cache coherency logic employing a cache coherency protocol to ensure data accessed by each agent is kept up to date. An example of a cache coherency protocol includes the MOESI protocol with the Modified (M), Owned (O), Exclusive (E), Shared (S), and Invalid (I) states. Coherence point 207 may be coupled to switch fabric 205, and coherence point 207 may be coupled to devices 204 and 206 via switch fabric 205. Devices 204 and 206 are representative of any number and type of devices within IC 200. In another embodiment, coherence point 207 and switch fabric 205 may be integrated within a single coherence controller.

Devices 204 and 206 may generally be any type of peripheral device or interface, implementing any hardware functionality included in the system other than the CPUs. For example, the devices 204 and 206 may include video peripherals such as cameras, camera interfaces, image processors, video encoders/decoders, scalers, rotators, blenders, graphics processing units, display controllers, etc. The devices 204 and 206 may include audio peripherals such as microphones, speakers, interfaces to microphones and speakers, audio processors, digital signal processors, mixers, etc. The devices 204 and 206 may include interface controllers for various interfaces external to IC 200, including interfaces such as Universal Serial Bus (USB), peripheral component interconnect (PCI) including PCI Express (PCIe), serial and parallel ports, etc. The devices 204 and 206 may include networking peripherals such as media access controllers (MACs). It is noted that in some embodiments, one or more of devices 204 and 18 may be external to IC 206.

Memory controller 203 may include any number of memory ports and may include circuitry configured to interface to memory. For example, memory controller 203 may be configured to interface to dynamic random access memory (DRAM) such as synchronous DRAM (SDRAM) (including mobile versions of the SDRAMs such as mDDR3, etc., and/or low power versions of the SDRAMs such as LPDDR2, etc.), RAMBUS DRAM (RDRAM), double data rate (DDR) SDRAM, DDR2 SDRAM, Rambus DRAM (RDRAM), static RAM (SRAM), etc. Memory controller 203 may also be coupled to memory physical interface circuits (PHYs) 201 and 202. Memory PHYs 201 and 202 are representative of any number of memory PHYs which may be coupled to memory controller 203. Memory PHYs 201 and 202 may be configured to interface to memory devices (not shown). Memory PHYs 201 and 202 may handle the low-level physical interface to the memory devices. For example, the memory PHYs 201 and 202 may be responsible for the timing of the signals, for proper clocking to synchronous DRAM memory, etc.

It is noted that other embodiments may include other combinations of components, including subsets or supersets of the components shown in FIG. 2 and/or other components. Throughout this detailed description, two or more instances of a given component may be included even if only one is shown, and/or embodiments that include only one instance may be used even if multiple instances are shown. In addition, in other embodiments, the connections between components of IC 200 may differ from those shown with regard to IC 102 as illustrated in FIG. 1.

Cache Memory Overview

Figure 3:
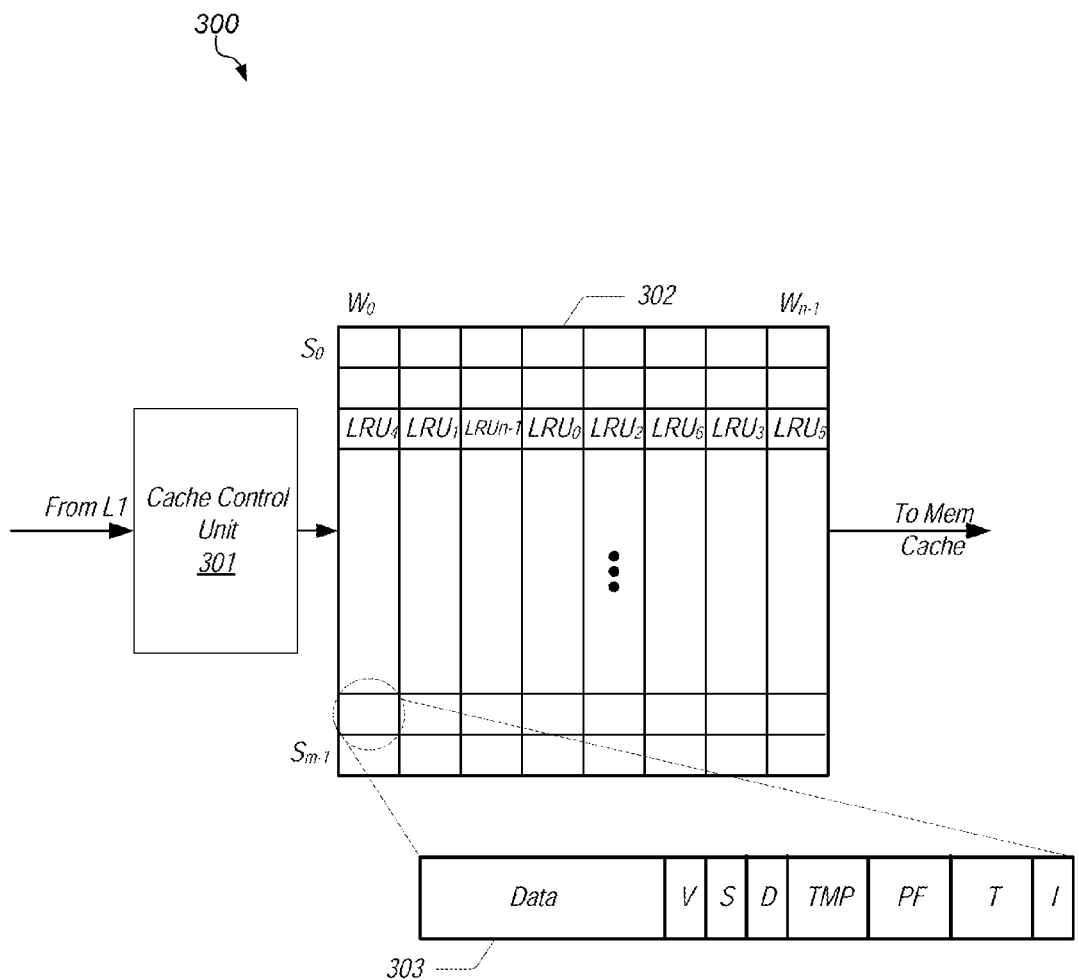
FIG. 3 is a block diagram of depicting aspects of an embodiment of the cache hierarchy.

Referring to FIG. 3, a block diagram of one embodiment of the L2 cache of FIG. 2 is shown. As shown in FIG. 3, the L2 cache 300 includes a cache control unit 301 coupled to a storage array 302. In one embodiment, the L2 cache 300 may be configured as a set associative n-way cache. In the illustrated embodiment, the L2 cache 300 includes n ways, which are labeled $W_0$ through $W_{n-1}$, where n may be any natural number. Similarly, the L2 cache 300 is configured to have m sets, which are labeled $S_0$ through $S_{m-1}$, where m may be any natural number.

In one embodiment, the storage array 302 may be configured to store data in a cache line configuration. It is noted that a cache line may be any number of bytes. A representative cache line 303 is shown in the exploded view of FIG. 3. As shown, the cache line 303 includes storage for data as well as a number of state and indicator bits. More particularly, the cache line 303 includes state bits (e.g., V, S, D), indicator bits (e.g., TMP bit, PF bit, and T bit), and an identifier bits (e.g., I).

The state bits may indicate the coherence state of the cache line. In one embodiment, the state bits may include a valid (V), shared (S), and dirty (D) bit. The indicator bits indicate various properties of a cache line. In one embodiment, a memory request may be characterized and so indicated by the TMP bit when it is correlated with other memory requests that occur near to it in time. Because these types of memory requests are correlated, they may have precedence when determining least recently used allocation priorities, as described further below. Thus, the TMP bit is a temporal bit that indicates whether the cache line was stored in the L2 cache 300 as a result of a temporal memory request. In one embodiment, the cache control unit 301 may perform prefetch operations from the system memory into the storage array 302. Accordingly, the PF bit indicates whether the cache line was stored in the L2 cache 300 as a result of a prefetch operation by the cache control unit 301. The PF bit may also be used when a cache line is evicted. More particularly, the cache control unit 301 may use the PF bit to determine whether or not the evicted cache line may be stored to a victim buffer. In one embodiment, prefetched cache lines that were not accessed are not stored to the victim buffer when evicted from the L2 cache 300.

The identifier bits may, in various embodiments, indicate which processor of multiple processors last accessed the corresponding cache line. The identifier bits may numerically encode a number that corresponds to a particular processor, although in other embodiments, any suitable encoding method may be used. As will be described in more detail below in regard to FIG. 6, the identifier bits of each cache line may be used by cache control unit 301 to select a cache line for eviction. While the identifier bits are shown as being stored in L2 cache 300, in various embodiments, the identifier bits for each cache memory may be stored in any suitable location, such as, a cache status array, for example.

Cache lines from the L2 cache 300 that are stored back to the L1 cache 213 or 214 (i.e., made a trip), may be considered to be used more frequently, and may, therefore, be considered a higher priority in the L2 cache 300. The Trip or T bit indicates that the cache line has been stored in the L1 cache 213 or 214, and was subsequently stored back in the L2 cache 300. Thus, in one embodiment, the T bit may be a sticky bit which is set when a cache line makes more than one trip between the L1 cache 213 or 214 and the L2 cache 300.

The cache control unit 301 may, in some embodiments, correspond to control circuitry 220 as illustrated in FIG. 2, and may be configured to control storage to and retrieval from the cache storage array 302. In one embodiment, the cache control unit 301 may include logic to determine, allocate, and keep track of the least recently used (LRU) position of cache line entries in the different ways of the cache storage array 302 using a true LRU replacement. The LRU position may be used in determining which cache line is evicted when the cache storage array 302 is full and a new cache line needs to be stored. In one embodiment, each way may be assigned to one of the possible LRU positions, and each set includes all the LRU positions. As shown in the embodiment of FIG. 3, way $W_0$ of an arbitrary set corresponds to $LRU_4$ and way $W_1$ of the same set corresponds to $LRU_1$ and so on up to $LRU_{n-1}$. In this scenario $LRU_0$ represents the least recently used cache line, and the $LRU_{n-1}$ represents the most recently used (MRU) cache line. In other embodiments, different LRU positions may be allocated to different ways of a given set.

Cache Line Eviction

During operation, as processors or processing cores access cache memories, such as, e.g., L2 cache 210, a need may arise to store a new cache line in a cache memory. In such cases, if no free storage is available, a previously stored cache line may need to be evicted in order to make room for the new cache line.

Figure 4:
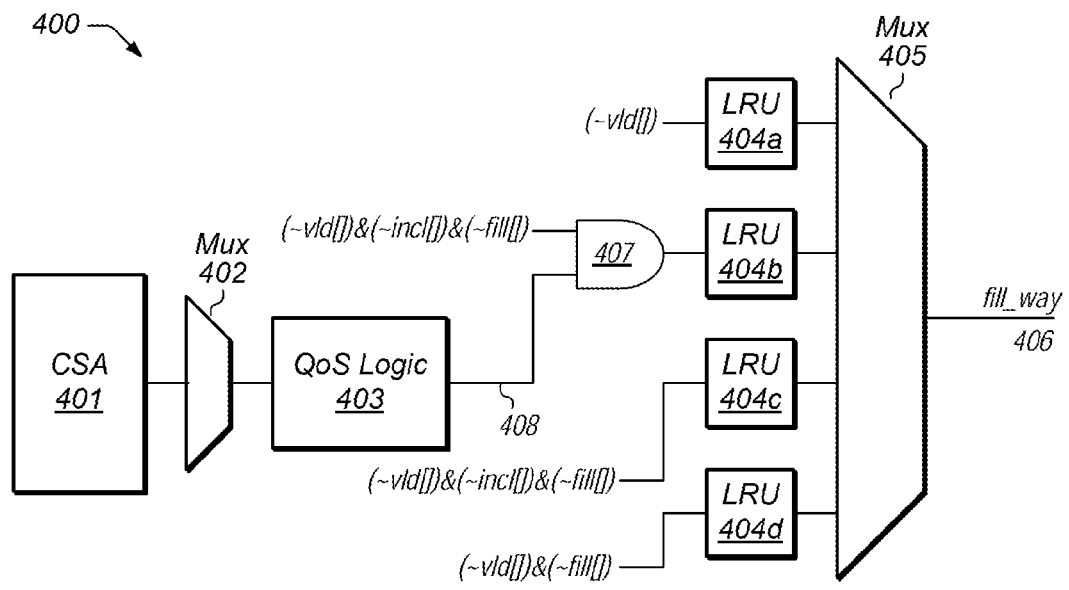
FIG. 4 is a block diagram of an embodiment of a cache control circuit.

A functional block diagram of an embodiment of cache control circuitry is illustrated in FIG. 4. The illustrated embodiment may, in various embodiments, correspond to a portion of control circuitry 220 as illustrated in FIG. 2. In the illustrated embodiment, control circuit 400 includes cache status array (CSA) 401, multiplex circuit 402, quality-of-service (QoS) logic 403, AND gate 407, least recently used (LRU) blocks 404a through 404d, and multiplex circuit 405.

CSA 401 may, in various embodiments, be configured to store status information of cache lines stored in a cache memory, such as, L2 cache 210 as illustrated in FIG. 2, for example. In some embodiments, the data stored in CSA 401 may correspond to the state, indicator, and identifier bits described above in regard to cache line 303. CSA 401 may be implemented in accordance with one of various design styles. In some embodiments, CSA 401 may be implemented using a Static Random Access Memory (SRAM), or any other suitable memory circuit.

Multiplex circuit 402 may select information from CSA 401 corresponding to a given cache line, and then send the selected information to QoS logic 403. In some embodiments, the multiplex function of multiplex circuit 402 may be implemented as part of CSA 401, or as a discrete functional block.

Multiplex circuits, such as those shown and described herein, may be constructed in accordance with one of various design styles. For example, in some embodiments, a multiplex circuit may include a plurality of tri-state buffers whose outputs are coupled together in a wired-OR fashion, and whose control inputs are dependent upon one of the selection inputs (not shown). In other embodiments, a multiplex circuit may include a plurality of logic gates configured to implement the desired multiplex.

QoS logic 403 may be configured to track a number of accesses each processor of a group of processors make to each cache line within a cache memory. Identifiers bits, such as those described above in reference to cache line 330 of FIG. 3, may be used in order to determine which processor has accessed which cache line. QoS logic 403 may include one or more counters that are incremented in response to a given processor accessing a cache line. Counters, such as those shown and described herein, may be one example of a sequential logic circuit configured to track a number of events, occurrences, and the like.

LRU blocks 404a through 404d may be configured to track a number of accesses may to each cache line, and based on the tracked number of accesses, determine a set of least recently used cache lines. The set of least recently used cache lines may be organized in various priority levels as described above in regard to FIG. 3. As with QoS logic 403, each of LRU blocks 404a through 404d may include counters configured to increment in response to each access to a cache line.

Each of LRU blocks 404a through 404d may correspond to a given priority in which cache lines are selected from the set of least recently used cache lines. For example, LRU 404a may select LRU cache lines which are invalid, and LRU 404b may select LRU cache lines that are valid and untouched, and that are not included in a lower level cache (i.e., non-inclusive). LRU 404b may select LRU cache lines that are valid, touched, and non-inclusive. In some embodiments, the status and indicator bits for LRU 404b may be combined with the output of QoS logic 403 using AND gate 407 to further refine the selection criteria as described in more detail below in regard to FIG. 6. Finally, LRU 404d may select cache lines that are valid but included in a lower level cache memory (i.e., inclusive). The outputs of each LRU block are coupled to multiplex circuit 405 which selects one of the outputs of the LRU blocks to generate fill_way 406. In some embodiments, fill_way 406 may indicate which cache line is to be evicted in order to make room for a new cache line.

Static AND gates, such as those shown and described herein, may be implemented according to several design styles. For example, an AND gate may be implemented as a NAND gate whose output is coupled to an inverter. In other embodiments, an AND gate may be constructed from multiple NAND gates, multiple NOR gates, or any suitable combination of logic gates. In a similar fashion, static OR gates, such as those shown and described herein, may also be implemented according to several design styles. For example, an OR gate may be implemented as a NOR gate whose output is coupled to an inverter, or another suitable combination of logic gates.

It is noted that the embodiment illustrated in FIG. 4 is merely an example. In other embodiments, different functional blocks and different arrangements of functional blocks may be employed.

Figure 5:
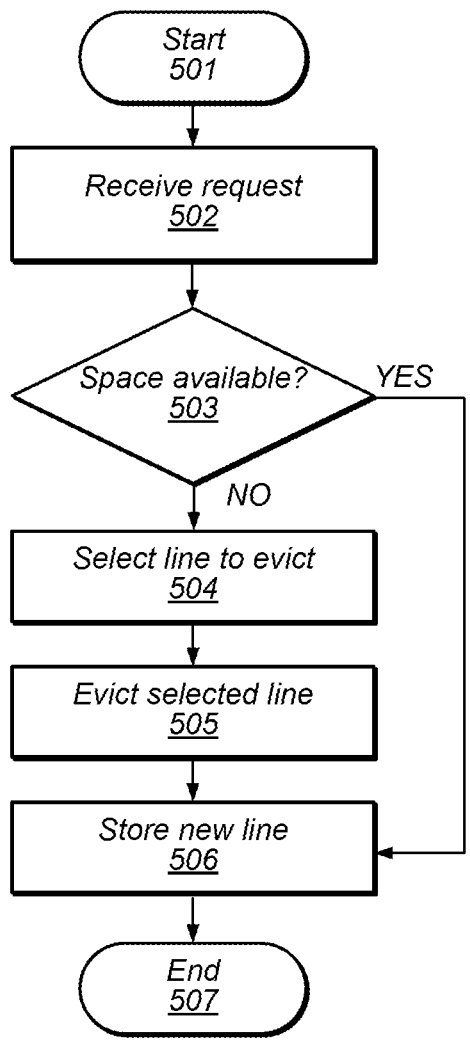
FIG. 5 illustrates a flow diagram of an embodiment of a method storing a new cache line in a cache memory.

Turning to FIG. 5, a flowchart depicting an embodiment of a method for operating a cache memory, such as, e.g., L2 cache 210, is illustrated. The method begins in block 501. A request for storing a new cache line may then be received (block 502). In some embodiments, the request may be received directly from a processor, while in other embodiments, the request from be received via a switch fabric from any one of a number of agents coupled to the switch fabric. A coherency point may, in some embodiments, monitor all requests to and responses from multiple cache memories in order to maintain coherency across the multiple cache memories.

The method may then depend on the space available in the cache memory (block 503). The amount of space available to store new cache lines may be stored in a separate memory, such as, e.g., cache status array 401 as illustrated in FIG. 4. In some embodiments, control circuitry coupled to the cache memory may scan through each entry in the cache to determine if an entry is available for storing the newly received cache line. When space is available in the cache memory, the new line may be stored (block 506). In addition to storing the new cache line, status information stored in another memory may also be updated. Once the newly received cache line has been stored in the cache memory, the method may conclude in block 507.

When there is not space available to store the newly received cache line, a previously stored line may then be selected for eviction (block 504). As described in more detail below in regard to FIG. 6, the selection process may include a determination of a number of times previously stored cache lines have been accessed. In some embodiments, an identifier, such as the identifier included in example cache line 303 as illustrated in FIG. 3, may be used to determine a number of cache lines accessed by each processor or processing core.

Once a cache line has been selected, the selected cache line may then be evicted (block 505). In various embodiments, the eviction process may include scheduling a write of data contained in the selected cache line back to memory. The write may be performed as part of a transaction scheduled in a switch fabric or other suitable communication mechanism used in a computer system. A coherency point, such as, e.g., coherency point 207 as illustrated in FIG. 2, may, in various embodiments, update other copies of the cache line stored in other cache memories. With the eviction of the selected cache line complete, the method may then proceed as described above from block 506.

It is noted that the method illustrated in FIG. 5 is merely an example. In other embodiments, different operations, and different orders of operations are possible and contemplated.

Figure 6:
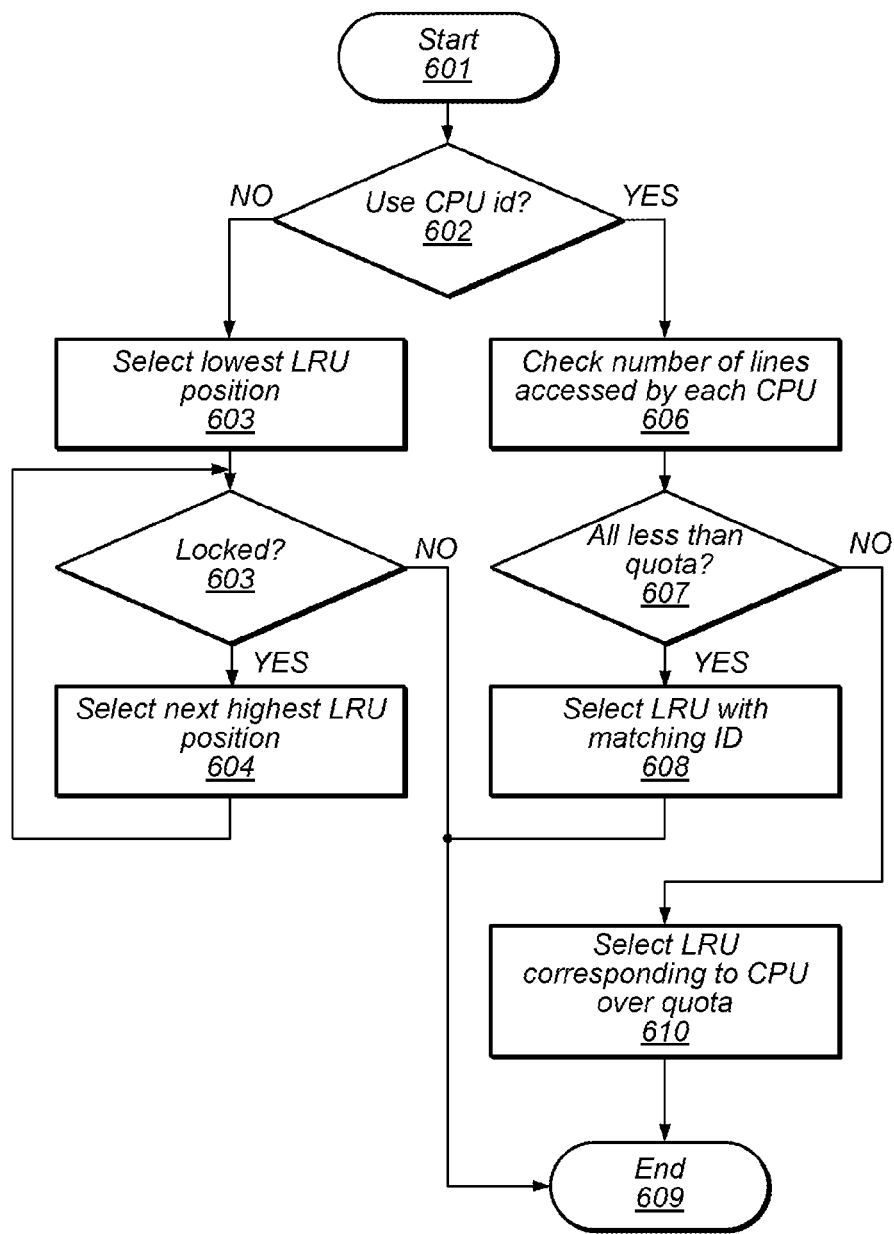
FIG. 6 illustrates a flow diagram of an embodiment of method selecting a cache line for eviction from a cache memory.

Turning to FIG. 6, a flowchart depicting an embodiment of a method for selecting a cache line for eviction from a cache memory coupled to multiple processors or CPUs is illustrated. In various embodiments, the method depicted in FIG. 6, may correspond to block 504 of the flowchart illustrated in FIG. 5. The method begins in block 601. The method may then depend on if a processor or CPU identifier is to be used in the selection process (block 602). Each cache line of the cache memory may include an identifier such as depicted in example cache line 303 as illustrated in FIG. 3. In various embodiments, the identifiers associated with individual cache lines may be stored in a memory separate from the cache memory. Previously stored data bits may be checked to determine if CPU identifiers are to be employed. In some embodiments, the data bits may be set to at a time a computing system is initialized or started from a powered off state.

When CPU identifiers are not to be used, a cache line occupying a lowest least recently used (LRU) position may then be selected (block 603). In some embodiments, a cache may include multiple LRU positions sorted by priority, i.e., a number of accesses. For example, a cache memory may include twelve positions, with position eleven being accessed less than position twelve, position ten being accessed less than position eleven and so forth.

The method may then depend on the status of the selected cache line (block 604). When the position is not locked, i.e., the position is not currently being filled, then the method may conclude (block 609). The selected cache line may then be schedule for eviction as described above in regard to FIG. 5.

When the selected cache line is locked, i.e., the cache line is currently being filled, then a cache line at the next highest LRU position may be selected (block 604). In some embodiments, only LRU positions below a threshold position value may be employed during the selection process. The threshold position value may, in various embodiments, be set upon initialization of a computing system, or dynamically during operation of the computing system based on various performance or operational parameters. With another cache line selected, the process may continue from block 604 as described above. In some embodiments, by selecting from the lowest LRU positions first, the old data may be preferentially evicted from a cache memory in response to requests from any processor coupled to the cache memory.

When CPU identifiers are to be used in the selection process, the number of cache lines accessed by each processor or CPU may then be checked (block 606). In various embodiments, circuitry associated with the cache memory may check the identifier associated with each cache line and count the number of cache lines accessed by each processor or CPU. Counters or other suitable sequential logic circuits may be employed to determine the number of lines accessed by each processor. Once the number of cache lines accessed by each processor has been determined, the method may then depend on the determined number of cache lines accessed (block 607).

In some embodiments, when the number of cache lines accessed by each processor is less than a predetermined threshold value (also referred to herein as a "quota"), a least recently used cache line with an identifier matching the processor that made the initial storage request (as described in block 502 of the flowchart illustrated in FIG. 5) may then be selected. As described above, once a cache line has been selected, the method may conclude in block 609, and the selected cache line evicted as described in block 505 of the flowchart illustrated in FIG. 5. It is noted that the quota value may be set when a computer system is initialized or changed dynamically in response to one or more performance or operational parameters.

In other embodiments, when the number of cache lines accessed by one or more processors exceeds the quota, then a least recently used cache line with an identifier corresponding to one of the one or more processors may be selected (block 610). In some embodiments, by selecting a cache line from a processor exceeding the quota, space may become available for other processors to store new cache lines, thereby improving computing performance. Although a single quota is described, in other embodiments, a different quota may be used for each processor coupled to the cache memory.

It is noted that although the method illustrated in FIG. 6 is described in the context of a cache memory, in various embodiments the method may be applied to individual cache ways within a cache memory. It is further noted that the operations illustrated in the flowchart of FIG. 6 are depicted as being performed in a sequential fashion. In other embodiments, one or more of the operations may be performed in parallel.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
   a memory configured to store a plurality of cache lines, wherein a particular cache line of the plurality of cache lines includes an identifier indicating a particular processor of a plurality of processors that performed a most recent access of the particular cache line of the plurality of cache lines;
   circuitry configured to:
      receive a request from a first processor of the plurality of processors to store a new cache line;
      in response to a determination that the identifiers included in each cache line are to be used in a cache line selection process:
         determine a respective number of cache lines accessed by each processor of the plurality of processors using the identifier included in each cache line;
         select, in response to a determination that each one of the respective number of cache lines accessed by each processor is less than a threshold value, a first cache line from a first group of least recently used cache lines, wherein the identifier for the first cache line corresponds to the first processor; and evict the first cache line; and
otherwise select a second cache line from a second group of least recently used cache lines and evict the second cache line wherein:
  each cache line of the second group of least recently used cache lines occupies a respective position of a plurality of ordered positions in the second group of least recently used cache lines;
  the respective position of a particular cache line of the second group is based on a number of times the particular cache line has been accessed;
  and the respective position of each cache line in the second group is less than a threshold position.

2. The apparatus of claim 1, wherein the circuitry is further configured to select, in response to a determination that the respective number of cache lines accessed by at least one processor of the plurality of processors is greater than the threshold value, a third cache line from the first group of least recently used cache lines and evict the third cache line, wherein the identifier for the third cache line corresponds to the at least one processor.

3. The apparatus of claim 1, wherein the circuitry is further configured to select the second cache line in response to a determination that the second cache line is unlocked.

4. The apparatus of claim 3, wherein the circuitry is further configured to select, in response to a determination that the second cache line is locked, a third cache line from the second group of least recently used cache lines and evict the third cache line, wherein the third cache line occupies a next higher position of the plurality of ordered positions than a position of the plurality of ordered positions occupied by the second cache line.

5. The apparatus of claim 1, wherein the circuitry is further configured to increment a particular counter of a plurality of counters in response to an access of a respective cache line of the plurality of cache lines.

6. A method, comprising:
  receiving a request from a first processor of a plurality of processors to store a new cache line in a cache memory, wherein the cache memory is configured to store a plurality of cache lines, wherein a particular cache line of the plurality of cache lines includes an identifier indicating a particular processor of the plurality or processors that performed a most recent access of the particular cache line;
  in response to determining that the identifiers included in each cache line are to be used in a cache line selection process;
    determining a respective number of cache lines accessed by each processor of the plurality of processors using the identifier included in the given cache line;
    selecting, in response to determining that each one of the respective number of cache lines accessed by each processor is less than a threshold value, a the first cache line from a first group of least recently used cache lines, wherein the identifier for first cache line corresponds to the first processor; and
    evicting the first cache line from cache memory;
  otherwise selecting a second cache line from a second group of least recently used cached lines and evicting the second cache line from the cache memory, wherein:
    each cache line of the second group of least recently used cache lines occupies a respective position of a plurality of ordered positions in the second group of least recently used cache lines;
    the respective position of a particular cache line of the second group is based on a number of times the particular cache line has been accessed; and
    the respective position of each cache line in the second group is less than a threshold position.

7. The method of claim 6, further comprising selecting, in response to a determination that the respective number of cache lines accessed by at least one processor of the plurality of processor is greater than the threshold value, a third cache line from the first group of least recently cache lines, wherein the identifier of the third cache line corresponds to the at least one processor.

8. The method of claim 6, further comprising selecting the second cache line in response to determining that the second cache line is unlocked.

9. The method of claim 8, further comprising selecting, in response to determining the second cache line is locked, a third cache line from the second group of least recently used cache lines and evict the third cache line, wherein the third cache line occupies a next higher position of the plurality of ordered positions than a position of the plurality of ordered positions occupied by the second cache line.

10. The method of claim 6, wherein the identifier of each cache line is stored in a memory separate from the cache memory.

11. The method of claim 6, further comprising incrementing a particular counter of a plurality of counters in response to accessing a respective cache line of the plurality of cache lines.

12. A system, comprising:
  a plurality of processors;
  a cache memory configured to:
    store a plurality of cache lines, wherein a particular cache line of the plurality of cache lines includes an identifier indicating a particular processor of the plurality of processors that performed a most recent access of the particular cache line;
    receive a request from a first processor of the plurality of processors to store a new cache line;
    in response to a determination that the identifiers included in each cache line are to be used in a cache line selection process:
      determine a respective number of cache lines accessed by each processor of the plurality of processors using the identifier included in each cache line;
      select, in response to a determination that each one of the respective number of cache lines accessed by each processor is less than a threshold value, a first cache line from a first group of least recently used cache lines, wherein the identifier for the first cache line corresponds to the first processor; and
      evict the first cache line; and
    otherwise select a second cache line from a second group of least recently used cached lines and evict the second cache line, wherein:
      each cache line of the second group of least recently used cache lines occupies a respective position of a plurality of ordered positions in the second group of least recently used cache lines;
      the respective position of a particular cache line of the second group is based on a number of times the particular cache line has been accessed; and
      the respective position of each cache line in the second group is less than a threshold position.

13. The system of claim 12, wherein the cache memory is further configured to select, in response to a determination that the respective number of lines accessed by at least one processor of the plurality of processors is greater than the threshold value, a third cache line from the first group of least recently used cache lines, wherein the identifier for the third cache line corresponds to the at least one processor.

14. The system of claim 12, wherein the cache memory is further configured to select the second cache line in response to a determination that the second cache line is unlocked.

15. The system of claim 14, wherein the cache memory is further configured to select, in response to a determination that the second cache line is locked, a third cache line from the second group of least recently used cache line and evict the third cache line, wherein the third cache line occupies a next higher position of the plurality of ordered positions that a position of the plurality of ordered positions occupied by the second cache line.

16. The system of claim 12, wherein to determine that the identifiers in each cache line are to be used in the cache line selection process, the cache memory is further configured to determine that the identifiers in each cache line are to be used in the selection process using at least one previously stored configuration data bit.

17. The system of claim 12, wherein the cache memory is further configured to increment a particular counter of a plurality of counters in response to accessing a respective cache line of the plurality of cache lines.

\* \* \* \* \*